United States Patent
Cheng et al.

(10) Patent No.: US 9,733,748 B2
(45) Date of Patent: Aug. 15, 2017

(54) TOUCH PANEL

(71) Applicant: AU Optronics Corporation, Hsin-Chu (TW)

(72) Inventors: Yi-Ru Cheng, Hsin-Chu (TW); Chung-Min Lien, Hsin-Chu (TW); Ya-Ling Hsu, Hsin-Chu (TW); Yueh-Hung Chung, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 211 days.

(21) Appl. No.: 14/504,873

(22) Filed: Oct. 2, 2014

(65) Prior Publication Data
US 2015/0205431 A1 Jul. 23, 2015

(30) Foreign Application Priority Data

Jan. 22, 2014 (TW) .............................. 103102315 A

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ...................................................... G06F 3/044
See application file for complete search history.

(56) References Cited

U.S. PATENT DOCUMENTS

| | | | |
|---|---|---|---|
| 8,674,284 B2 | 3/2014 | Liu et al. | |
| 2009/0009485 A1 | 1/2009 | Bytheway | |
| 2010/0214256 A1* | 8/2010 | Wu | G06F 3/044 345/174 |
| 2012/0044176 A1* | 2/2012 | Nakamura | G06F 3/0412 345/173 |
| 2012/0146936 A1* | 6/2012 | Liu | G09G 3/3648 345/174 |
| 2012/0327022 A1 | 12/2012 | Bytheway | |
| 2014/0098064 A1 | 4/2014 | Lien et al. | |
| 2015/0220174 A1 | 8/2015 | Mu et al. | |

FOREIGN PATENT DOCUMENTS

| | | |
|---|---|---|
| CN | 101681213 | 3/2010 |
| CN | 103150069 | 6/2013 |
| CN | 103488349 | 1/2014 |
| TW | 201317868 | 5/2013 |

* cited by examiner

*Primary Examiner* — Michael Faragalla
*Assistant Examiner* — Chayce Bibbee
(74) *Attorney, Agent, or Firm* — WPAT, PC

(57) ABSTRACT

A touch panel is disclosed herein. The touch panel includes a driving line, a gate line, a readout line, and a switching unit. The driving line is configured to transmit a driving signal. The gate line is configured to transmit a scan signal. The readout line forms a mutual capacitance with the gate line, and the mutual capacitance is configured to generate a first sensing signal in response to a driving signal according to a touch operation. The switching unit is electrically coupled to the gate line and the readout line, and configured to be selectively turned on to transmit the first sensing signal to the readout line according to the scan signal.

16 Claims, 12 Drawing Sheets

TOUCH PANEL

This application claims priority to Taiwan Application Serial Number, 103102315, filed Jan. 22, 2014, which is herein incorporated by reference.

BACKGROUND

Technical Field

The present disclosure relates to a touch panel. More particularly, the present disclosure relates to a sensing circuit of a touch panel.

Description of Related Art

Reference is made to FIG. 1. FIG. 1 is a schematic diagram of a conventional mutual capacitive touch panel. The conventional mutual capacitive touch panel 100 includes gate lines TX, readout lines RX and a sensing circuit 120. In such conventional mutual capacitive touch panel, the gate lines TX and the readout lines RX are interlaced in vertical, and thus multiple sensing points are formed, in which a mutual capacitance Cx is present between the sensing points. The driving lines TX are configured to sequentially transmit a driving signal VX.

When a touch operation is performed on a specific sensing point, the capacitance value of the corresponding mutual capacitor is changed, and a voltage difference is generated to the readout line RX in response to amplitude $\Delta V$ of the driving signal VX. Thus, the sensing circuit 120 is able to determine whether there is a touch operation according to the voltage difference.

For illustration, it's assumed that the conventional mutual capacitive touch panel 100 has 100 driving lines TX. When the touch operation is not performed, a voltage V1=$\Delta V$ [Cx/(100Cx+Cr)] is transmitted to the readout line RX, in which Cr is a self-capacitance of the readout line RX. When the touch operation is performed, the capacitance value of the corresponding mutual capacitor is changed from Cx to CX'. Thus, a voltage V2=$\Delta V$ [Cx'/(100Cx+Cr)] is transmitted to the readout line RX. In summary, when a touch operation is performed on the sensing point, the voltage difference on the sensing point is: V1−V2=$\Delta V$[(Cx−Cx')/(100Cx+Cr)]. As a result, the sensing circuit 120 is able to determine the location of the sensing point being touched according to the aforesaid voltage difference.

However, as applications for panels with large-size or high resolution have become more and more popular, the numbers of the driving lines TX and the readout lines CX are significantly increased. Thus, the numbers of CX in the denominator of the equation above are increased, and the voltage difference is thus reduced. As a result, a poor sensibility of touch operations is caused.

Therefore, a heretofore-unaddressed need exists to address the aforementioned deficiencies and inadequacies.

SUMMARY

One aspect of the present disclosure is to provide a touch panel. The touch panel includes a driving line, a gate line, a readout line, and a switching unit. The driving line is configured to transmit a driving signal. The gate line is configured to transmit a scan signal. The readout line forms a mutual capacitance with the gate line, and the mutual capacitance is configured to generate a first sensing signal in response to a driving signal according to a touch operation. The switching unit is electrically coupled to the gate line and the readout line, and configured to be selectively turned on to transmit the first sensing signal to the readout line according to the scan signal.

Another aspect of the present disclosure is to provide a touch panel. The touch panel includes a driving line, a gate line, a readout line, and an amplifying unit. The driving line is configured to transmit a driving signal. The readout line forms a mutual capacitance with the driving line, and the mutual capacitance being configured to generate a first sensing signal in response to the driving signal in accordance with a touch operation. The amplifying unit is configured to generate a second sensing signal in accordance with the first sensing signal.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
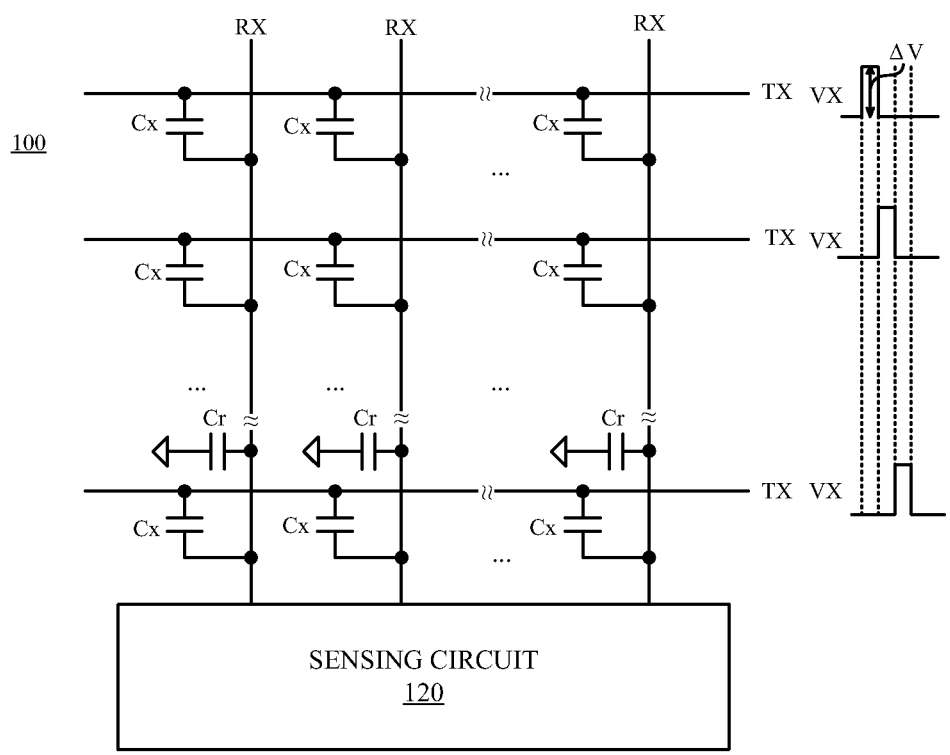
FIG. 1 is a schematic diagram of a conventional mutual capacitive touch panel.

Reference will now be made in detail to the present embodiments of the invention, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

In this document, the term "coupled" may also be termed as "electrically coupled", and the term "connected" may be termed as "electrically connected". "Coupled" and "connected" may also be used to indicate that two or more elements cooperate or interact with each other.

Figure 2:
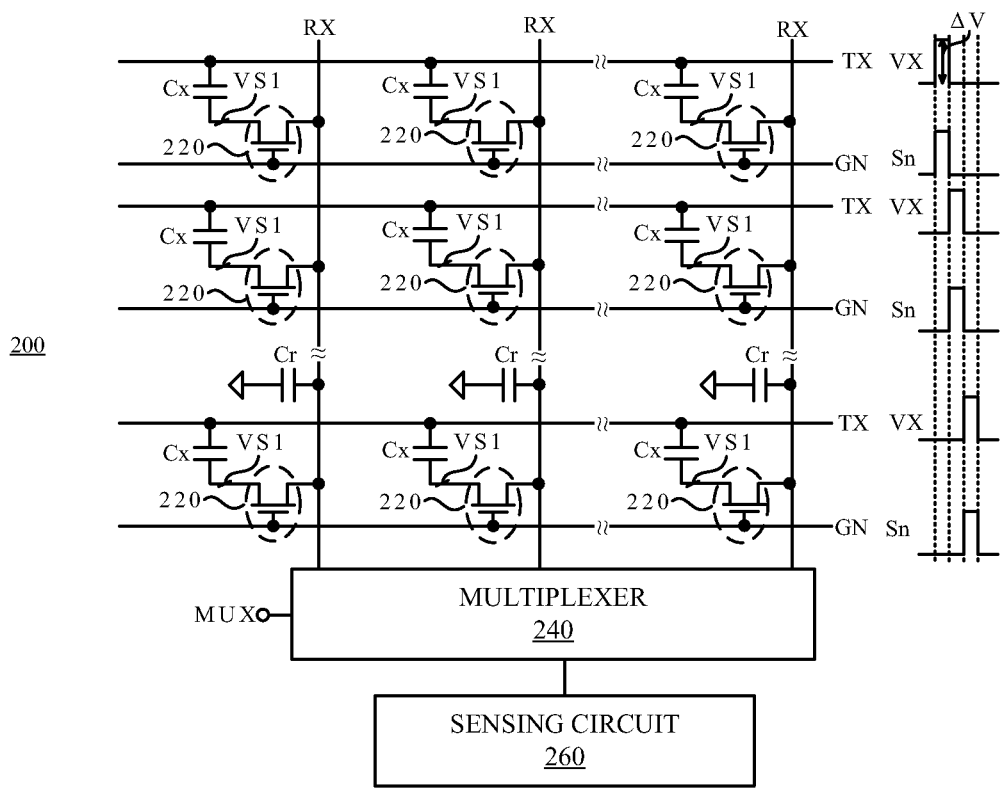
FIG. 2 is a schematic diagram of a touch panel according to one embodiment of the present disclosure.

Reference is made to FIG. 2. FIG. 2 is a schematic diagram of a touch panel according to one embodiment of the present disclosure. As shown in FIG. 2, the touch panel 200 includes driving lines TX, gate lines GN, readout lines RX, switching units 220, a multiplexer 240, and a sensing circuit 260.

The gate lines TX and the readout line RX are interlaced with each other (preferably, interlaced in vertical), in which each of the driving lines TX forms mutual capacitances Cx with each of the readout lines RX. The driving lines TX is configured to sequentially transmit driving signals VX. The gate lines GN are essentially disposed to the corresponding driving lines TX in parallel, and are configured to sequentially transmit scan signals Sn.

Further, the mutual capacitance Cx is able to generate a first sensing signal VS1 to the switching unit 220 in response to the driving signal VX according to a touch operation. The switching unit 220 is configured to be selectively turned on to transmit the first sensing signal VS1 to the readout line RX according to the scan signal Sn. The mulitplexer 240 is configured to transmit the first sensing signal from a corresponding readout line RX to the sensing circuit 260 for identifying the touch operations according to a multiplex control signal MUX.

Specifically, as shown in FIG. 2, a first terminal of the switching unit 220 is configured to receive the first sensing signal VS1, a second terminal of the switching unit 220 is electrically coupled to the readout line RX, and a control terminal of the switching unit 220 is configured to receive the scan signal Sn.

In this way, whenever the readout line RX receives the first sensing signals VS1, there is only one corresponding switching unit 220 being turned on, and rest of the switching units 220 are turned off. As a result, the first sensing signal VS1 is avoided to be reduced by being divided across others mutual capacitances Cx.

In other words, in the touch panel 200 of this embodiment, when a touch operation is performed, the first sensing signal VS1 is able to derived as: VS1=$\Delta V \times (Cx/Cr)$, in which Cr is a self-capacitance of the readout line RX. Accordingly, compared with the conventional mutual capacitive touch panel 100, the sensibility of touch operations can be improved.

Figure 3A:
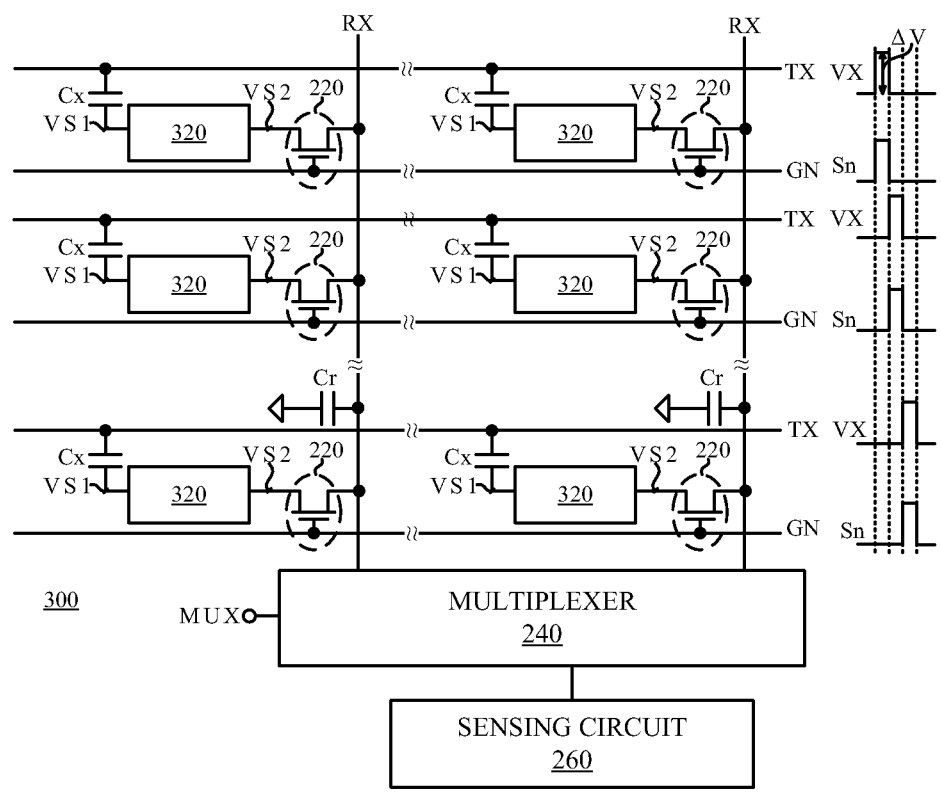
FIG. 3A is a schematic diagram of a touch panel according to one embodiment of the present disclosure.

Reference is made to FIG. 3A. FIG. 3A is a schematic diagram of a touch panel 300 according to one embodiment of the present disclosure. In the applications for high resolution, the self-capacitance Cr of the readout line Rx may be too large to reduce the value of the first sensing signal VS1 of the touch panel 200.

Therefore, as shown in FIG. 3A, compared with the touch panel 200, the touch panel 300 further includes amplifying units 320. The amplifying unit 320 is configured to generate a second sensing signal VS2 according to the first sensing signal VS1. In this embodiment, the switching unit 220 is further configured to transmit the second sensing signal VS2 to the readout line RX according to the scan signal Sn. As the first sensing signal VS1 is amplified by the amplifying unit 320 to generate the second sensing signal VS2 to the readout line RX, the sensibility of the touch panel 300 is thus improved.

The following paragraphs provide certain embodiments related to the amplifying unit 320 to illustrate functions and applications thereof. For simplicity, the following descriptions are described with one driving line TX, one readout line RX, and one gate line GN. However, the present disclosure is not limited to the following embodiments.

Figure 3B:
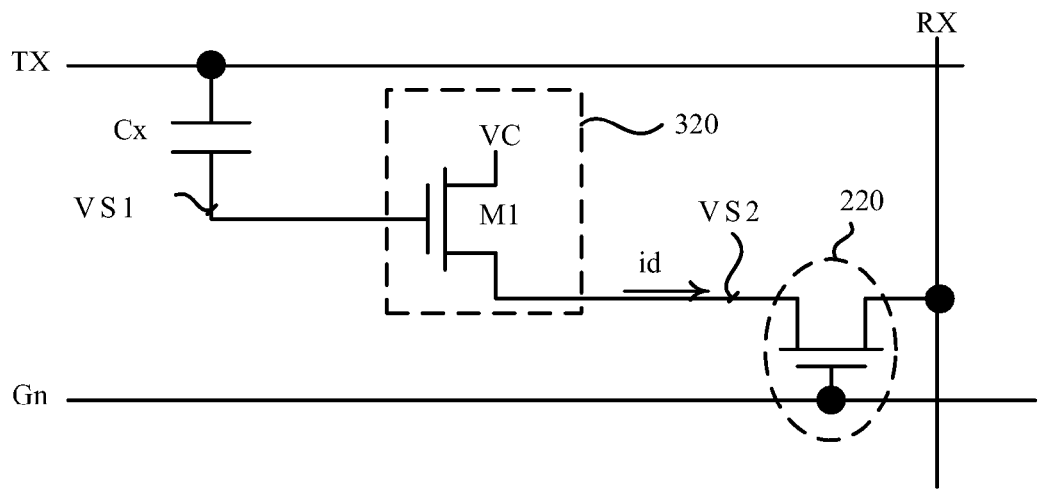
FIG. 3B is a schematic diagram in a partial of circuits in the touch panel shown in FIG. 3A according to one embodiment of the present disclosure.

Reference is made to FIG. 3B. FIG. 3B is a schematic diagram in a partial of circuits in the touch panel shown in FIG. 3A according to one embodiment of the present disclosure. As shown in FIG. 3B, the amplifying unit 320 includes a driving switch M1. A first terminal of the driving switch M1 is configured to receive a first control signal VC1, a second terminal of the driving switch M1 is configured to generate the second sensing signal VS2, and a control terminal of the driving switch M1 is configured to receive the first sensing signal VS1.

In this embodiment, the driving switch M1 can be a transistor, and the voltage on the gate of transistor, i.e., the control terminal, is changed by the first sensing signal VS1 to generate the corresponding current id (i.e., the second sensing signal VS2) to the readout line RX. The sensing circuit 260 can convert the output current id to the voltage for determining the touch operations.

Figure 3C:
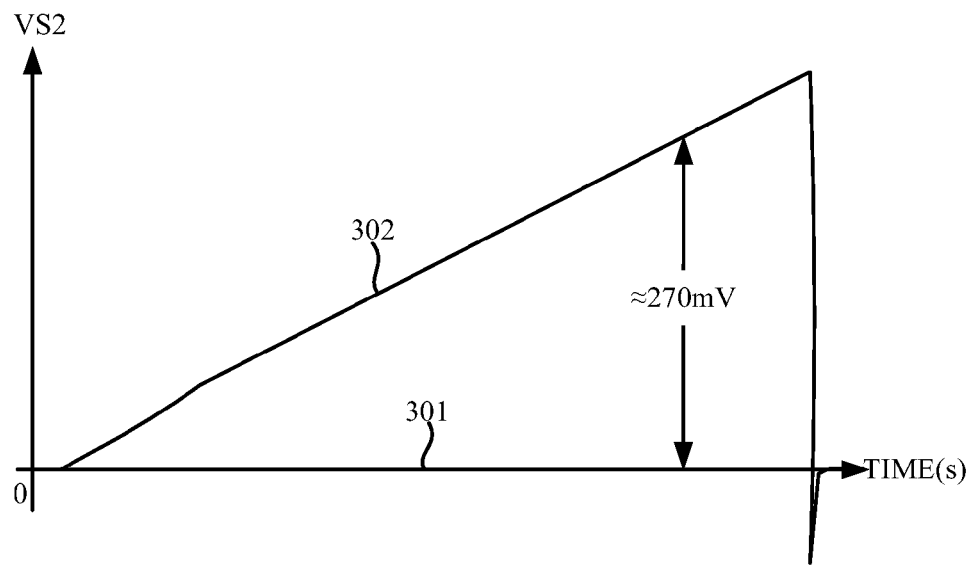
FIG. 3C is a waveform diagram illustrating the second sensing signal of FIG. 3B according to one embodiment of the present disclosure.

Reference is made to FIG. 3C. FIG. 3C is a waveform diagram illustrating the second sensing signal of FIG. 3B according to one embodiment of the present disclosure. As shown in FIG. 3C, the waveform 301 is the waveform of the second sensing signal VS2 without the touch operation. The waveform 302 is the waveform of the second sensing signal VS2 with the touch operation. When the touch operation is performed on the touch panel 300, the amplitude of the first sensing signal VS1 is increased when the rise of the driving signal VX, and thus the amplitude of the second sensing signal VS2 (current id) is also increased. That is, the second sensing signal VS2 can be amplified by the amplifying unit 320 (i.e., driving switch M1), and can be reduced as the driving signal VX falls to a low voltage level (e.g., 0 Volts). Compared with the waveform 301, the waveform 302 has a significant voltage amplitude difference, for example, about 270 mill volts (mV), and thus the sensibility of touch operations is improved.

Figure 3D:
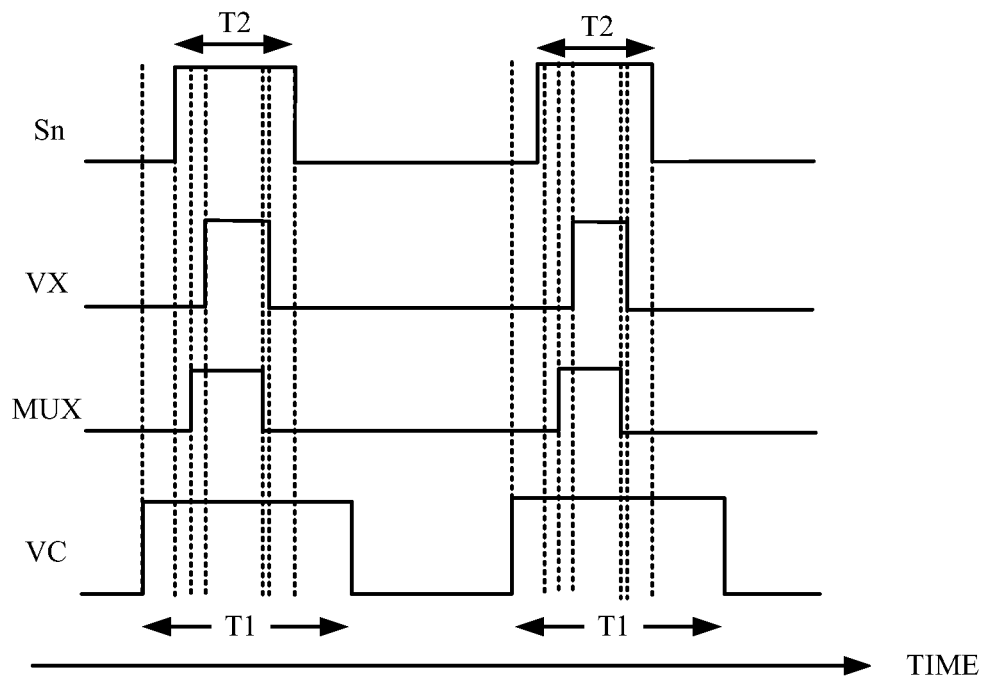
FIG. 3D is a waveform diagram illustrating the signals of the touch panel shown in FIG. 3B according to one embodiment of the present disclosure.

Reference is made to FIG. 3D. FIG. 3D is a waveform diagram illustrating the signals of the touch panel shown in FIG. 3B according to one embodiment of the present disclosure. In one embodiment of the present disclosure, the first control signal VC can be a DC voltage. In other embodiment of the present disclosure, the first control signal VC can be an AC driving signal. For illustration, as shown in FIG. 3D, the first control signal VC has a first enabling period T1, the scan signal Sn has a second enabling period T2, and the first enabling period T1 and the second enabling period T2 are overlapped, in which the first enabling period is longer than the second enabling period T2. With such configuration, the driving switch M1 can be driven by the first control signal VC before receiving the scan signal Sn, and can be turned off after the second sensing signal VS2 is transmitted. Thus, the power consumption of the touch panel 300 is reduced. The driving signal VX and the multiplex control signal MUX are also overlapped with the first enabling period T1 and the second enabling period T2, and the enabling periods of the driving signal VX and the multiplex control signal MUX are substantially shorter than the second enabling period T2.

Figure 4A:
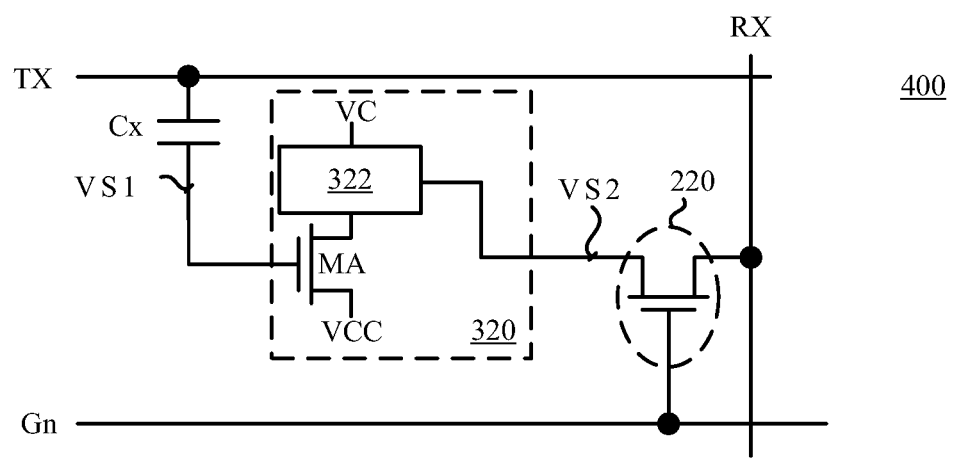
FIG. 4A is a schematic diagram of a touch panel according to one embodiment of the present disclosure.

Reference is made to FIG. 4A. FIG. 4A is a schematic diagram of a touch panel according to one embodiment of the present disclosure. In this embodiment, the amplifying unit 320 of the touch panel 400 includes a driving switch MA and a voltage division circuit 322. A control terminal of the driving switch MA is configured to receive the first sensing signal VS1 so that the driving switch MA can be selectively turned on according to the first sensing signal VS1, a first terminal of the driving switch MA is configured to generate the second sensing signal VS2, and a second terminal of the driving switch MA is configured to receive a second control signal VCC. In other words, in this embodiment, the second sensing signal VS2 with larger amplitude can be generated by performing the voltage division on the first control signal VC and the second control signal VCC.

Figure 4B:
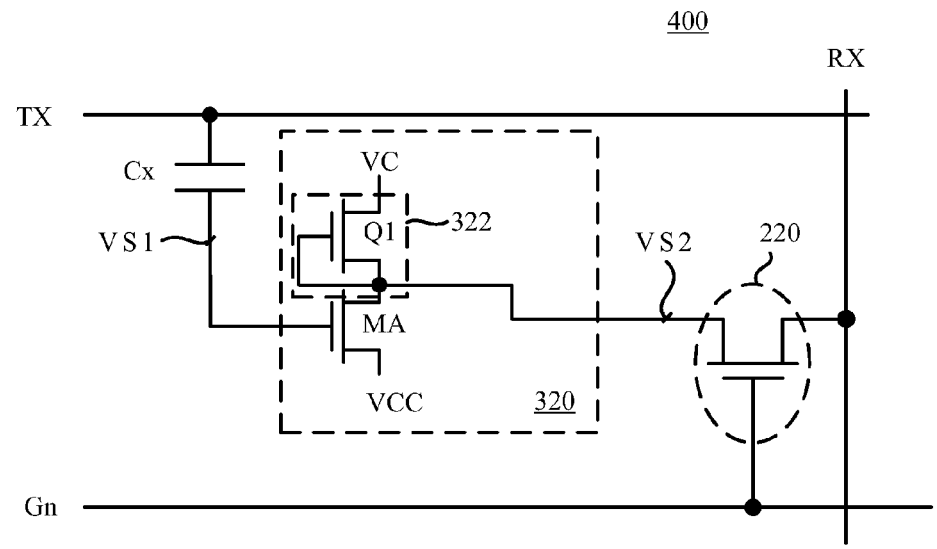
FIG. 4B is a circuit diagram of the amplifying unit shown in FIG. 4A according to one embodiment of the present disclosure.

Reference is made to FIG. 4B. FIG. 4B is a circuit diagram of the amplifying unit shown in FIG. 4A according to one embodiment of the present disclosure. In this embodiment, the voltage division circuit 322 includes a switch Q1. A first terminal of the switch Q1 is configured to receive the first control signal VC, and a second terminal and a control terminal of the switch Q1 are electrically coupled to the first terminal of the driving switch MA. When the driving switch MA receives the first sensing signal VS1 and is turned on, the switch Q1 is also turned on, and the second sensing signal VS2 with greater amplitude is generated by performing the voltage division on the first control signal VC and the second control signal VCC.

Figure 4C:
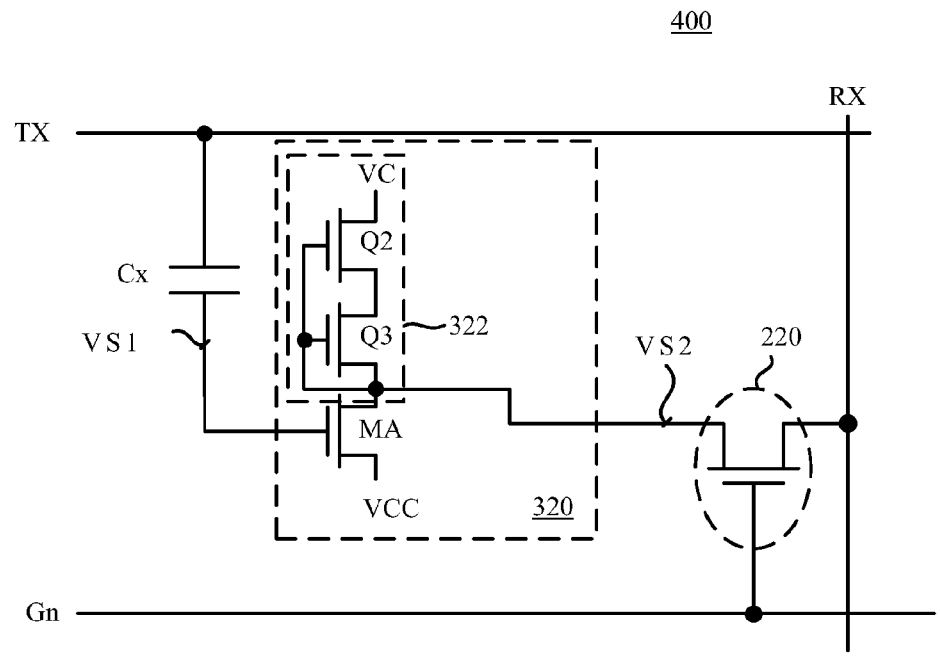
FIG. 4C is a circuit diagram of the amplifying unit shown in FIG. 4A according to another one embodiment of the present disclosure.

Reference is made to FIG. 4C. FIG. 4C is a circuit diagram of the amplifying unit shown in FIG. 4A according to another one embodiment of the present disclosure. In this embodiment, the voltage division circuit 322 includes a switch Q2 and a switch Q3. A first terminal of the switch Q2 is configured to receive the first control signal VC, and a second terminal of the switch Q2 is electrically coupled to a first terminal of the switch Q3. A second terminal of the switch Q3 is electrically coupled to the first terminal of the driving switch MA, and control terminals of the switch Q2 and the switch Q3 are electrically coupled to the first terminal of the driving switch MA. With such configuration, when the driving switch MA is turned on, the switches Q2 and Q3 are also turned on, and the second sensing signal VS2 is thus generated by performing the voltage division on the first control signal VC and the second control signal VCC.

Figure 4D:
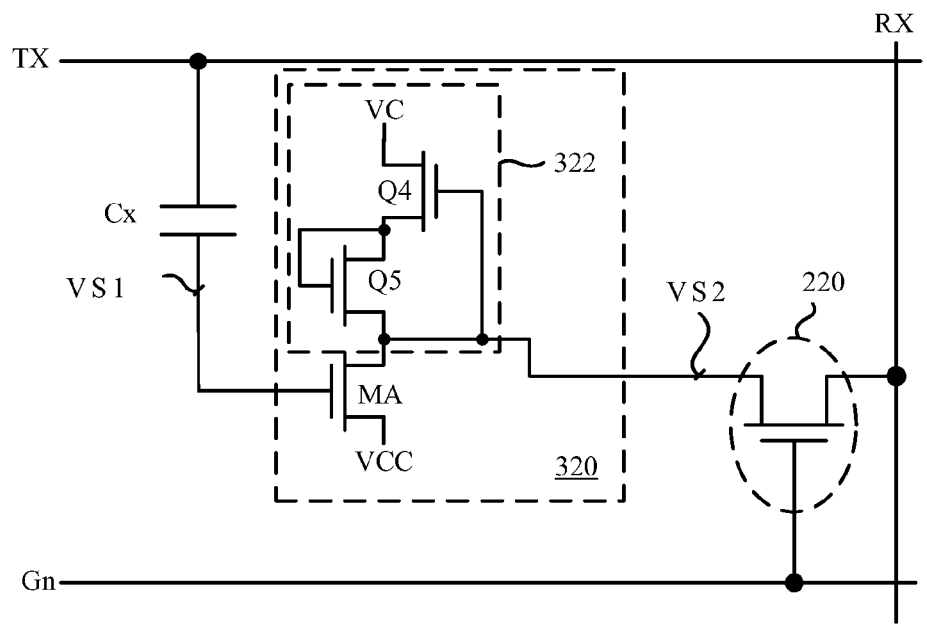
FIG. 4D is a circuit diagram of the amplifying unit shown in FIG. 4A according to yet another embodiment of the present disclosure.

Reference is made to FIG. 4D. FIG. 4D is a circuit diagram of the amplifying unit shown in FIG. 4A according to yet another embodiment of the present disclosure. In this embodiment, the voltage division circuit 322 includes a switch Q4 and a switch Q5. A first terminal of the switch Q4 is configured to receive the first control signal VC, a second terminal of the switch Q4 is electrically coupled to a first terminal of the switch Q5. A second terminal of the switch Q5 is electrically coupled to the first terminal of the driving switch MA, and a control terminal of the switch Q5 is electrically coupled to the first terminal of the switch Q5. When the driving switch MA is turned on, the switches Q4 and Q5 are also turned on to generate the second sensing signal VS2 to the readout line RX. For illustration, the voltage level of the first control signal VC is set to about 30 Volts, and the voltage level of the second control signal VCC is set to about −10 Volts. When the driving switch MA is turned on by the first sensing signal VS1, the voltage level of the second sensing signal VS2 is increased to turn on the switch Q4, and thus the driving switch MA and the switches Q4 and Q5 perform the voltage division on the first control signal VC and the second control signal VCC to increase the voltage level of the second sensing signal VS2 to about 18 Volts.

In each of embodiments above, with different configurations, the voltage division circuit 322 can generate the second sensing signal with different values. One of ordinary skill in the art can utilize one of the configurations for implementing the voltage division circuit 322 in accordance with practical applications.

Figure 5A:
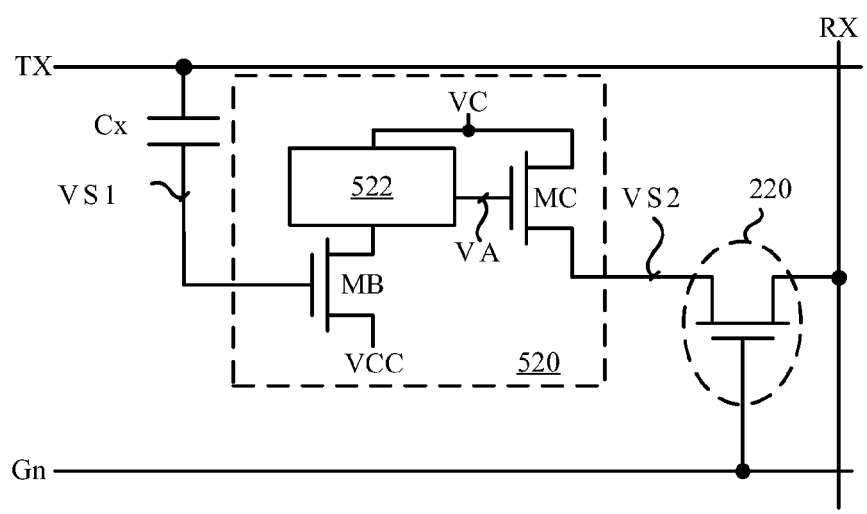
FIG. 5A is a schematic diagram of a touch panel according to one embodiment of the present disclosure.

Reference is made to FIG. 5A. FIG. 5A is a schematic diagram of a touch panel according to one embodiment of the present disclosure. In this embodiment, the amplifying unit 520 of the touch panel 500 includes a control switch MB, a voltage division circuit 522, and a driving switch MC.

The control switch MB is configured to be selectively turned on according to the first sensing signal VS1. The voltage division circuit 522 is configured to generate a control voltage VA by performing a voltage division on the first control signal VC and the second control signal VCC when the control switch MB is turned on. The driving switch MC is configured to generate the second sensing signal VS2. A first terminal of the driving switch MC is configured to receive the first control signal VC, a control terminal of the driving switch MC is configured to receive the control voltage VA, and a second terminal of the driving switch MC is configured to transmit the second sensing signal VS2.

Figure 5B:
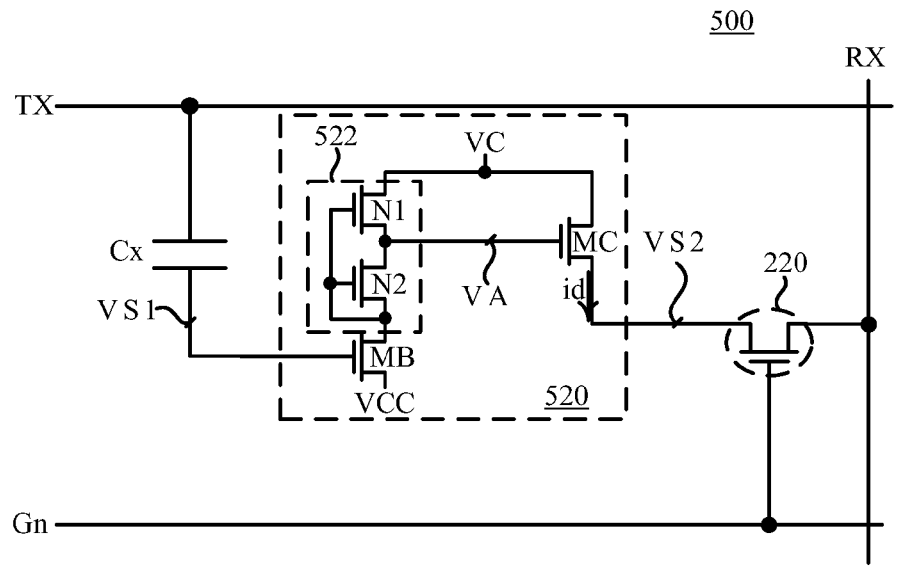
FIG. 5B is a circuit diagram of the amplifying unit shown in FIG. 5A according to one embodiment of the present disclosure.

Reference is made to FIG. 5B. FIG. 5B is a circuit diagram of the amplifying unit shown in FIG. 5A according to one embodiment of the present disclosure. In this embodiment, the voltage division circuit 522 includes a switch N1 and a switch N2. A first terminal of the switch N1 is configured to receive the first control signal VC, and a second terminal of the switch N1 is configured to generate the control voltage VA. A first terminal of the switch N2 is electrically coupled to the second terminal of the switch N1, a second terminal and a control terminal of the switch N2 are electrically coupled to the first terminal of the control switch MB, and the second terminal of the control switch MB is configured to receive the second control signal VCC.

Furthermore, in this embodiment, the driving switch MC can be a transistor. When the control switch MB is turned on by the first sensing signal VS1, the switches N1 and N2 are able to generate the control voltage VA by performing the voltage division on the first control signal VC and the second control signal VC, in which the control voltage VA can change the voltage level of the gate of the driving switch MC, so as to generate the corresponding current id (i.e., the second sensing signal VS2) to the readout line RX.

Figure 5C:
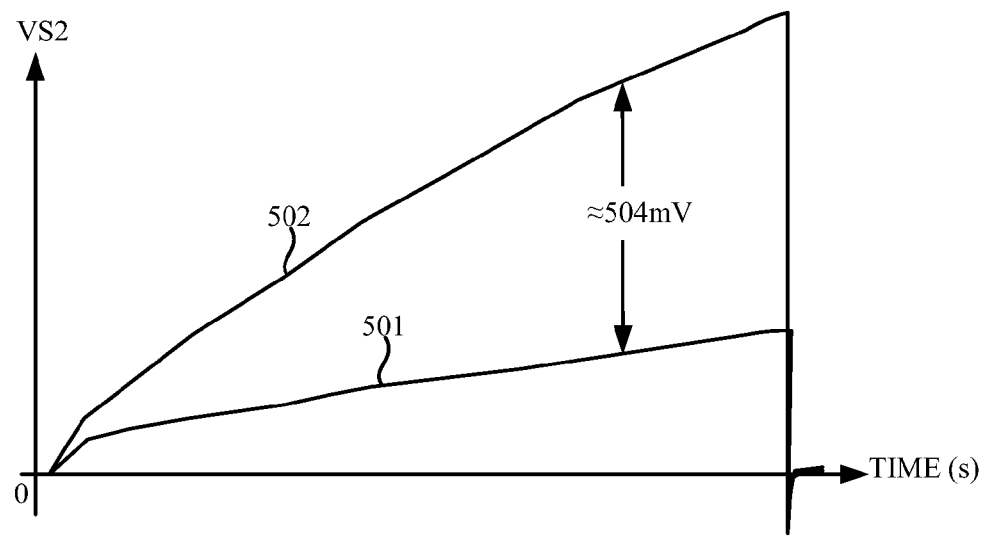
FIG. 5C is a waveform diagram illustrating the second sensing signal shown in FIG. 5B according to one embodiment of the present disclosure.

Reference is made to FIG. 5C. FIG. 5C is a waveform diagram illustrating the second sensing signal shown in FIG. 5B according to one embodiment of the present disclosure. As shown in FIG. 5C, the waveform 501 is the waveform of the second sensing signal VS2 without the touch operation, and the waveform 502 is the waveform of the second sensing signal VS2 with the touch operation. When the touch operation is performed on the touch panel 500, the control switch MB is turned on by the first sensing signal VS1, and thus the voltage level of the control voltage VA is gradually increased from the voltage division. As a result, the second sensing signal VS2 (i.e., current id) is also increased. That is, the second sensing signal VS2 can be amplified by the amplifying unit 520. Then, when the control switch MB is turned off as the first sensing signal is returned to the low voltage level (e.g., about 0 Volts), the second sensing signal VS2 is also returned to the low voltage level. Compared with the waveform 501 (i.e., the waveform without touch operation), a significant difference of the signal amplitude, for example, about 540 volts, can be generated on the waveform 502.

Figure 5D:
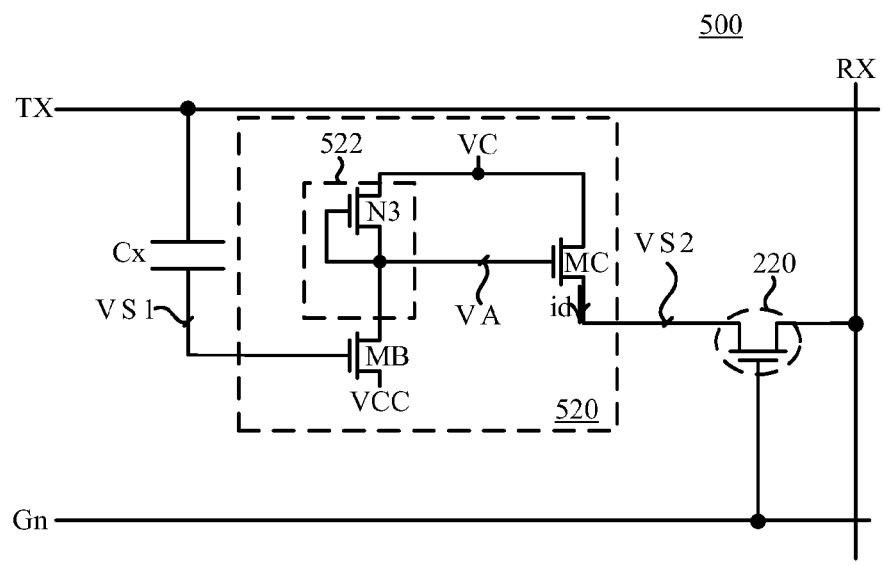
FIG. 5D is a circuit diagram of the amplifying unit shown in FIG. 5A according to another one embodiment of the present disclosure.

Reference is made to FIG. 5D. FIG. 5D is a circuit diagram of the amplifying unit shown in FIG. 5A according to another one embodiment of the present disclosure. As shown in FIG. 5D, the amplifying unit 520 includes a switch N3. A first terminal of the switch N3 is configured to receive the first control signal VC, and a second terminal and a control terminal of the switch N3 are electrically coupled to the first terminal of the control switch MB to generate the control voltage VA, in which the second terminal of the control switch MB is configured to receive the second control signal VCC.

Figure 5E:
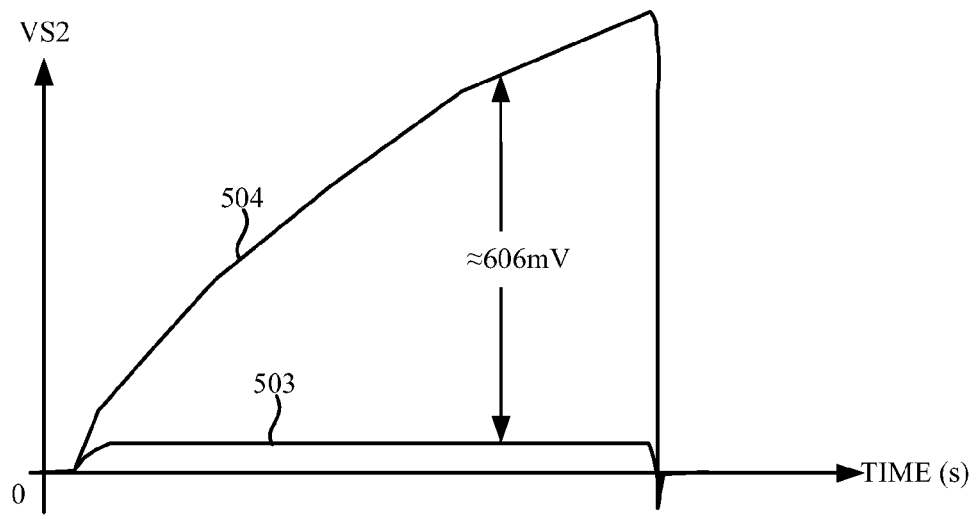
FIG. 5E is a waveform diagram illustrating the second sensing signal shown in FIG. 5D according to one embodiment of the present disclosure.

Reference is made to FIG. 5E. FIG. 5E is a waveform diagram illustrating the second sensing signal shown in FIG. 5D according to one embodiment of the present disclosure. As shown in FIG. 5E, the waveform 503 is the waveform of the second sensing signal VS2 without the touch operation, and the waveform 504 is the waveform of the second sensing signal VS2 with the touch operation. Similarly, when the touch operation is performed on the touch panel 500, the control switch MB is turned on by the first sensing signal VS1, and thus the voltage level of the control voltage VA is gradually increased from the voltage division. As a result, the second sensing signal VS2 can be amplified by the amplifying unit 520. When the control switch MB is turned off as the first sensing signal VS1 is returned to the low voltage level (e.g., about 0 Volts), the second sensing signal VS2 is also returned back to the low voltage level. In addition, in this embodiment, as the control voltage VA is generated from the voltage division only by one switch M3, a more significant difference of the signal amplitude, for example, about 606 volts, can be obtained when the waveform 502 shown in FIG. 5C is compared.

Figure 5F:
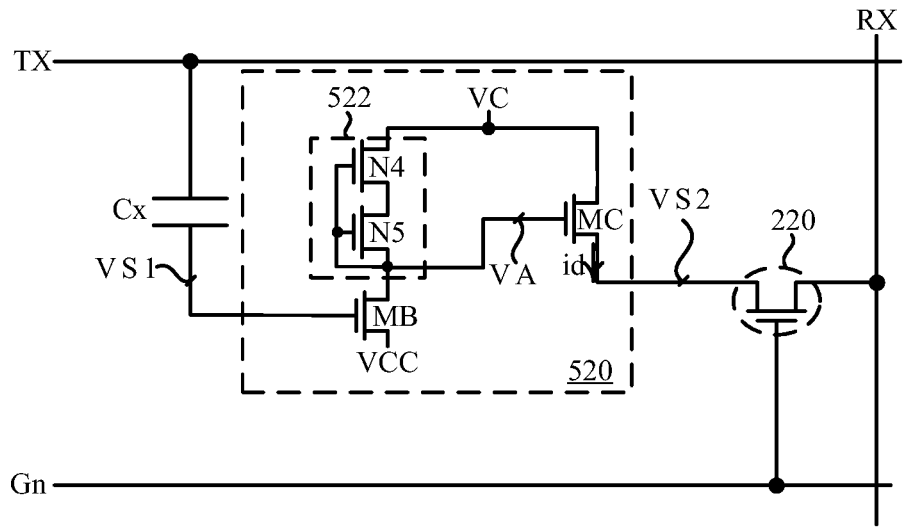
FIG. 5F is a circuit diagram of the amplifying unit shown in FIG. 5A according to yet another one embodiment of the present disclosure.

Reference is made to FIG. 5F. FIG. 5F is a circuit diagram of the amplifying unit shown in FIG. 5A according to yet another one embodiment of the present disclosure. In this embodiment, as shown in FIG. 5F, the voltage division circuit 522 includes a switch N4 and a switch N5. A first terminal of the switch N4 is configured to receive the first control signal VC. A first terminal of the switch N5 is electrically coupled to a second terminal of the switch N4, and a control terminal of the switch N4 and a second terminal and a control terminal of the switch N4 are electrically coupled to the first terminal of the control switch MB to generate the control voltage VA, in which the second terminal of the control switch MB is configured to receive the second control signal VCC.

Similarly, in this embodiment, the driving switch MC can be a transistor. When the control switch is turned on by the first sensing signal VS1, the switches N4 and N5 are able to generate the control voltage VA by performing voltage division, and thus the driving switch MC can generate a corresponding output current id (i.e., the second sensing signal VS2).

Figure 5G:
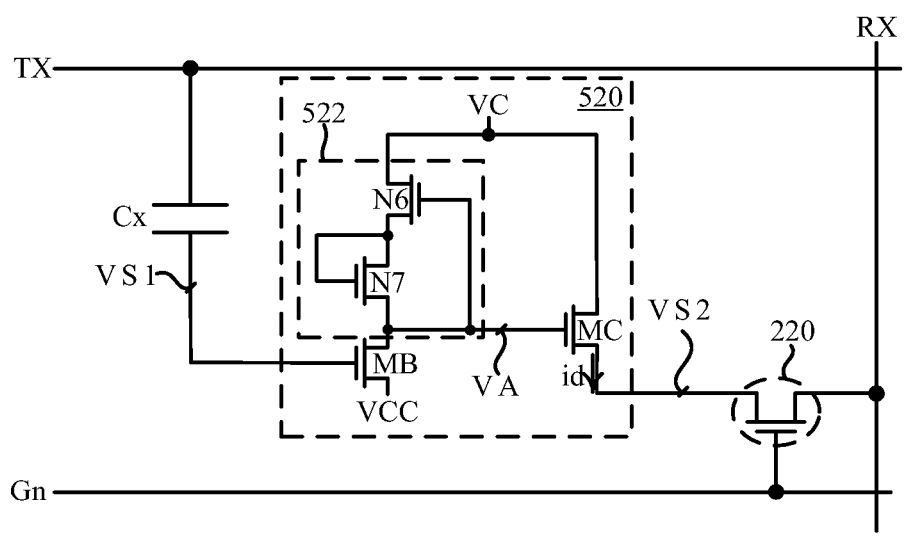
FIG. 5G is a circuit diagram of the amplifying unit shown in FIG. 5A according to yet other one embodiment of the present disclosure.

Reference is made to FIG. 5G. FIG. 5G is a circuit diagram of the amplifying unit shown in FIG. 5A according to yet other one embodiment of the present disclosure. In this embodiment, the voltage division circuit 522 includes a switch N7 and a switch N7. A first terminal of the switch N6 is configured to receive the first control signal VC. A first terminal and a control terminal of the switch N7 are electrically coupled to a second terminal of the switch N6, and a control terminal of the switch N6 and a second terminal of the switch N7 are electrically coupled to the first terminal of the control switch MB to generate the control voltage VA. As the operations of this embodiment are similar with the embodiments above, the repetitious details are not given here.

Figure 5H:
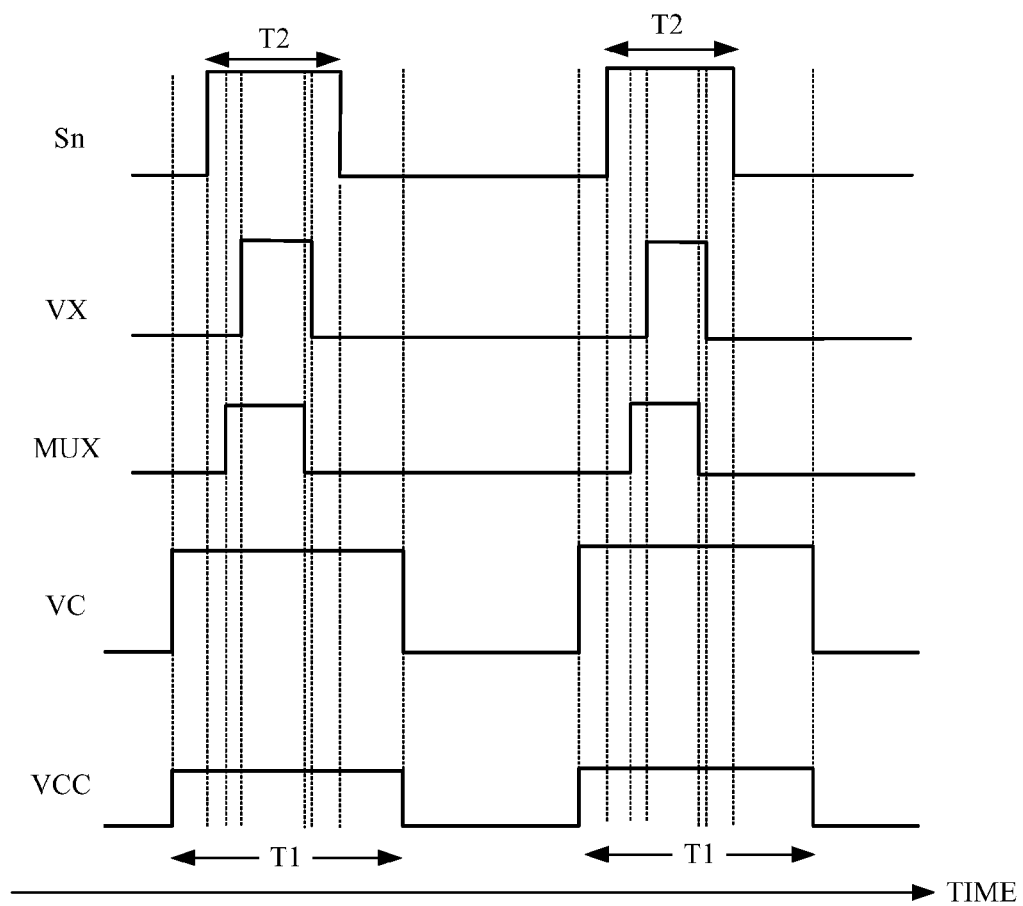
FIG. 5H is a waveform diagram illustrating the signals of the touch panel shown in FIG. 5A according to one embodiment of the present disclosure.

Reference is made to FIG. 5H. FIG. 5H is a waveform diagram illustrating the signals of the touch panel shown in FIG. 5A according to one embodiment of the present disclosure. In various embodiments above, the first control signal VC can be a DC voltage or an AC voltage. For illustration, as shown in FIG. 5H, the first control signal VC and the second control signal VCC have a first enabling period T1, and the scan signal has a second enabling period T2, in which the first enabling period T1 and the second enabling period T2 are overlapped. Accordingly, with the configurations of AC driving signals, the power consumption and the noises in the transmissions of signals are reduced. The enabling periods of the driving signal VX and the multiplex control signal VX are overlapped with the first enabling period T1 and the second enabling period T2, in which the enabling periods of the driving signal VX and the multiplex control signal VX are substantially shorter than the second enabling period T2.

In addition, during the first enabling period T1, the first control signal VC has a first voltage level (e.g., about 30 Volts), and the second control signal VCC has a second voltage level (e.g., about 10 Volts), in which the first voltage level and the second voltage level are required to be different to make the amplifying unit 520 perform correct operations.

Furthermore, the waveforms illustrated in FIG. 5D can be applied in the embodiments illustrated in FIG. 4A-4D. As the operations are similar, the repetitious details are not given here. The switches, control switches or switching units in various embodiments are able to be any type of transistors, such as thin-film transistors (TFT), field-effect transistors or the like, and the present disclosure is not limited thereto.

Moreover, in the embodiments illustrated in FIG. 3A, FIG. 4A-4D, and FIG. 5A-5G, the touch panel 300 can be operated without the switching unit 220, and the amplifying unit 320 can be directly connected to the readout line RX and gate line (or scan line) GN to perform the same operations. One of ordinary skills in the art can set the switching unit 220 according to the practical applications.

Figure 6:
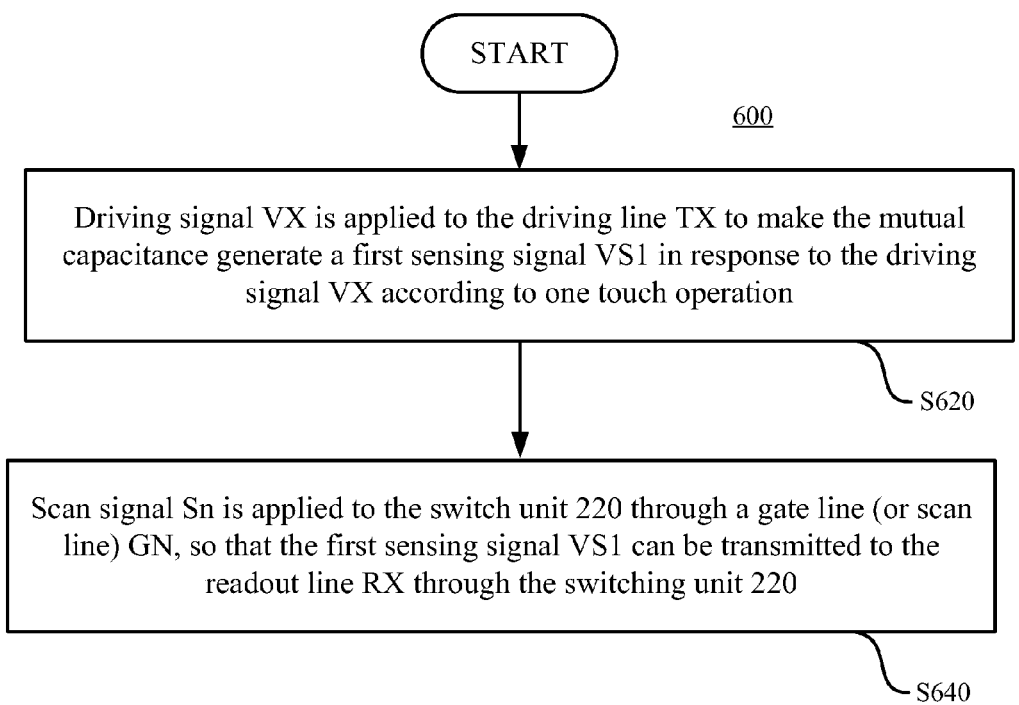
FIG. 6 is a flow chart of a method for improving a sensibility of touch operations according to one embodiment of the present disclosure.

Another aspect of the present disclosure provides a method for improving a sensibility of touch operations, and the method is adapted for a touch panel including readout lines and driving lines, in which each readout line forms a mutual capacitance with each driving line. Reference is made to FIG. 6. FIG. 6 is a flow chart of a method for improving a sensibility of touch operations according to one embodiment of the present disclosure. As shown in FIG. 6, the method 600 includes steps S620 and S640.

In step S620, the driving signal VX is applied to the driving line TX to make the mutual capacitance generate a first sensing signal VS1 in response to the driving signal VX according to one touch operation. In step S640, a scan signal Sn is applied to the switch unit 220 through a gate line (or scan line) GN, so that the first sensing signal VS1 can be transmitted to the readout line RX through the switching unit 220.

For illustration, as shown in FIG. 2, by performing the aforesaid steps, whenever the readout line RX of the touch panel 200 reads the first sensing signal VS1, there is only one corresponding switching unit 200 being turned on. As a result, the sensibility of touch operations is significantly improved.

In addition, in one embodiment, the method 600 can generate a second sensing signal VS2 according to the second sensing signal VS2, and the switching unit 220 can transmit the second sensing signal VS2 according to the scan signal Sn. For illustration, as shown in FIG. 3B, the first sensing signal VS1 can be converted to the second sensing signal VS2 (i.e., current id) by the driving switch M1 (i.e., a transistor), and thus the first sensing signal VS1 is amplified to improve the sensibility of touch operations.

Alternatively, in another one embodiment, the first sensing signal VS1 is inputted to the control terminal of the driving switch MA, and the second sensing signal VS2 is generated from the first terminal of the driving switch MA, in which the first terminal of the driving switch MA is electrically coupled to the voltage division circuit 322, and the second sensing signal VS2 is generated by performing the voltage division on the first control signal VC and the second control signal VCC through the voltage division circuit 322. For illustration, as shown in FIG. 4A, the driving switch MA is turned on according to the first sensing signal VS1, and the voltage division circuit 322 thus amplifies the first sensing signal VS1. As a result, the sensibility of touch operations is improved.

In yet another one embodiment of the present disclosure, as shown in FIG. 5A, the step of generating the second sensing signal VS2 includes: selectively turning on the control switch MB; performing voltage division on the first control signal VC and the second control signal VCC to generate a control voltage VA when the control switch MB is turned on; and conversing the control voltage VA to the second sensing signal VS2 (i.e., current id) through the driving switch MC. With such steps, the second sensing signal VS2 with higher amplitude can be generated, and thus the sensibility of touch operations in high-resolution applications is improved.

In summary, the touch panel and the method for improving the sensibility of touch operations of the present disclosure can be applied in large-size or high-resolution applications, and are able to improve the sensibility of touch operations thereto.

It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A touch panel, comprising:
   a driving line configured to transmit a driving signal;
   a gate line configured to transmit a scan signal;
   a readout line, forming a mutual capacitance with the driving line, the mutual capacitance being configured to generate a first sensing signal in response to a driving signal according to a touch operation;
   a switching unit electrically coupled to the gate line and the readout line, and configured to be selectively turned on to transmit the first sensing signal to the readout line according to the scan signal; and
   an amplifying unit configured to generate a second sensing signal according to the first sensing signal, and the switching unit being further configured to transmit the second sensing signal to the readout line, wherein the amplifying unit comprises:
      a driving switch, wherein a control terminal of the driving switch is configured to receive the first sensing signal, and a first terminal of the driving switch is configured to generate the second sensing signal; and
      a voltage division circuit electrically coupled to the first terminal of the driving switch, and configured to perform a voltage division on a first control signal and a second control signal,
   wherein a second terminal of the driving switch is configured to receive the second control signal.

2. The touch panel of claim 1, wherein a first terminal of the switching unit is configured to receive the first sensing signal, a second terminal of the switching unit is electrically coupled to the readout line, and a control terminal of the switching unit is configured to receive the scan signal.

3. The touch panel of claim 1, wherein the amplifying unit comprises:
   the driving switch, comprising:
      the first terminal configured to receive the first control signal;
      a second terminal configured to generate the second sensing signal; and
      the control terminal configured to receive the first sensing signal.

4. The touch panel of claim 3, wherein the first control signal has a first enabling period, the second control signal has a second enabling period, wherein the first enabling period and the second enabling period are overlapped, and the first enabling period is longer than the second enabling period.

5. The touch panel of claim 1, wherein the amplifying unit comprises:
   a control switch configured to be selectively turned on in accordance with the first sensing signal;
   the voltage division circuit configured to perform the voltage division on the first control signal and the second control signal to generate control signal when the control switch is turned on; and
   the driving switch configured to generate the second sensing signal in accordance with the control voltage.

6. The touch panel of claim 5, wherein the voltage division circuit comprises:
   a first switch, wherein a first terminal of the first switch is configured to receive the first control signal, a second terminal of the first switch is configured to generate the control voltage; and
   a second switch, wherein a first terminal of the second switch is electrically coupled to the second terminal of the first switch, a control terminal of the first switch and a control terminal and a second terminal of the second switch is electrically coupled to the first terminal of the control switch, wherein a second terminal of the control switch is configured to receive the second control signal.

7. The touch panel of claim 5, wherein the voltage division circuit comprises:
a first switch, wherein a first terminal of the first switch is configured to receive the first control signal, a second terminal and a control terminal of the first switch is electrically coupled to a first terminal of the control switch to generate the control voltage,
wherein a second terminal of the control switch is configured to receive the second control signal.

8. The touch panel of claim 5, wherein the voltage division circuit comprises:
a first switch, wherein a first terminal of the first switch is configured to receive the first control signal; and
a second switch, wherein a first terminal of the second switch is electrically coupled to a second terminal of the first switch, a control terminal of the first switch and a second terminal and a control terminal of the second switch are electrically coupled to a first terminal of the control switch to generate the control voltage,
wherein a second terminal of the control signal is configured to receive the second control signal.

9. The touch panel of claim 5, wherein the voltage division circuit comprises:
a first switch, wherein a first terminal of the first switch is configured to receive the first control signal; and
a second switch, wherein a first terminal and a control terminal of the second switch is electrically coupled to a second terminal of the first switch, a control terminal of the first switch and a second terminal of the second switch are electrically coupled to a first terminal of the control switch to generate the control voltage,
wherein a second terminal of the control signal is configured to receive the second control signal.

10. A touch panel, comprising:
a driving line configured to transmit a driving signal;
a readout line forming a mutual capacitance with the driving line, the mutual capacitance being configured to generate a first sensing signal in response to the driving signal in accordance with a touch operation; and
an amplifying unit configured to generate a second sensing signal in accordance with the first sensing signal, wherein the amplifying unit comprises:
a driving switch, wherein a control terminal of the driving switch is configured to receive the first sensing signal, a first terminal of the driving switch is configured to generate the second sensing signal, and a second terminal of the driving switch is configured to receive a second control signal; and
a voltage division circuit electrically coupled to the first terminal of the driving switch, and configured to perform a voltage division on a first control signal and a second control signal to generate the second sensing signal.

11. The touch panel of claim 10, wherein the driving switch comprising:
the first terminal configured to receive the first control signal;
the second terminal configured to generate the second sensing signal; and
the control terminal configured to receive the first sensing signal.

12. The touch panel of claim 11, further comprising:
a switching unit electrically coupled to the amplifying unit and the readout line, and configured to be selectively turned on to transmit the second sensing signal to the readout line according to a scan signal,
wherein the first control signal has a first enabling period, the scan signal has second enabling period, wherein the first enabling period and the second enabling period are overlapped, and the first enabling period is longer than the second enabling period.

13. The touch panel of claim 10, further comprising:
a switching unit electrically coupled to the amplifying unit and the readout line, and configured to be selectively turned on to transmit the second sensing signal to the readout line according to a scan signal,
wherein the first control signal and the second control signal have a first enabling period, and the scan signal has a second enabling period, the first enabling period and the second enabling period are overlapped, and the first enabling period is longer than the second enabling period,
wherein the first control signal is at a first voltage level and the second control signal is at a second voltage level during the first enabling period, and the first voltage level is different with the second voltage level.

14. The touch panel of claim 10, wherein the amplifying unit comprises:
a control switch configured to be selectively turned on according to the first sensing signal;
the voltage division circuit configured to perform a voltage division on the first control signal and the second control signal when the control switch is turned on, so as to generate a control voltage; and
the driving switch configured to generate the second sensing signal according to the control voltage.

15. The touch panel of claim 14, further comprising:
a switching unit electrically coupled to the amplifying unit and the readout line, and configured to be selectively turned on to transmit the second sensing signal to the readout line according to a scan signal,
wherein the first control signal and the second control signal have a first enabling period, and the scan signal has a second enabling period, the first enabling period and the second enabling period are overlapped, and the first enabling period is longer than the second enabling period,
wherein the first control signal is at a first voltage level and the second control signal is at a second voltage level during the first enabling period, and the first voltage level is different with the second voltage level.

16. The touch panel of claim 14, wherein the voltage division circuit comprises:
a first switch, wherein a first terminal of the first switch is configured to receive the first control signal, and a second terminal of the first switch is configured to generate the control voltage; and
a second switch, wherein a first terminal of the second switch is electrically coupled to the second terminal of the first switch, a control terminal of the first switch and a second terminal and a control terminal of the second switch are electrically coupled to the first terminal of the control switch,
wherein a second terminal of the control switch is configured to receive the second control signal.

* * * * *